(12) United States Patent
Coffman

(10) Patent No.: US 12,508,961 B2
(45) Date of Patent: Dec. 30, 2025

(54) SNAP HOOK WITH CLIP INSERT

(71) Applicant: Indiana Mills & Manufacturing, Inc., Westfield, IN (US)

(72) Inventor: Brian Nelson Coffman, Westfield, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 180 days.

(21) Appl. No.: 18/468,106

(22) Filed: Sep. 15, 2023

(65) Prior Publication Data

US 2024/0001824 A1   Jan. 4, 2024

Related U.S. Application Data

(63) Continuation of application No. PCT/US2022/071281, filed on Mar. 23, 2022.

(60) Provisional application No. 63/268,194, filed on Feb. 17, 2022, provisional application No. 63/200,698, filed on Mar. 23, 2021.

(51) Int. Cl.
  *B60N 2/28* (2006.01)

(52) U.S. Cl.
  CPC ......... *B60N 2/2887* (2013.01); *B60N 2/2806* (2013.01); *B60N 2/2809* (2013.01); B60N 2/2816 (2023.08)

(58) Field of Classification Search
  CPC .. B60N 2/2887; B60N 2/2806; B60N 2/2809; B60N 2/2816; F16B 45/036
  See application file for complete search history.

(56) References Cited

U.S. PATENT DOCUMENTS

| | | | |
|---|---|---|---|
| 1,180,387 | A | 4/1916 | Farrand |
| 1,456,264 | A | 5/1923 | Billmeyer |
| 2,026,930 | A | 1/1936 | Bishpahm |
| 2,146,035 | A | 2/1939 | Simmons et al. |

(Continued)

FOREIGN PATENT DOCUMENTS

| | | |
|---|---|---|
| DE | 7200617 U | 5/1972 |
| EP | 3913253 A1 | 11/2021 |

(Continued)

OTHER PUBLICATIONS

PCT, Int. App. No. PCT/US2022/071281 Written Opinion of the International Searching Authority, 4 pages, Jul. 6, 2022.

(Continued)

*Primary Examiner* — Philip F Gabler
(74) *Attorney, Agent, or Firm* — Woodard, Emhardt, Henry, Reeves & Wagner, LLP

(57) ABSTRACT

A snap hook configured to secure a car seat within a vehicle. The restraint system includes a hook body that has a hook at one end and a handle portion at an opposing end. The snap hook further includes a clip insert with a gate. The clip insert is configured to snap fit into an opening defined by the handle portion. The snap hook is configured to attach to the car seat by a belt and/or other suitable attachment device received within a belt opening. The gate extends from the clip insert so that an end of the gate is biased to contact the hook of the hook body. As should be appreciated, the gate is rotatable away from contact with the hook to form a gap. The gap enables a user to secure the snap hook to an anchor point within the vehicle.

20 Claims, 20 Drawing Sheets

(56) References Cited

U.S. PATENT DOCUMENTS

| | | | |
|---|---|---|---|
| 4,899,483 A | 2/1990 | Pippert | |
| 5,832,571 A * | 11/1998 | Kanamori | F16B 45/027 |
| | | | 24/599.6 |
| 6,772,488 B1 | 8/2004 | Jensen et al. | |
| 6,820,310 B2 * | 11/2004 | Woodard | B60N 2/2893 |
| | | | 297/476 |
| 6,948,219 B2 * | 9/2005 | Kakuda | B60N 2/2806 |
| | | | 24/302 |
| 7,165,294 B2 | 1/2007 | Surdam | |
| 7,862,124 B2 * | 1/2011 | Dingman | B60N 2/2863 |
| | | | 297/476 |
| 8,079,116 B2 | 12/2011 | Ayers et al. | |
| 8,360,202 B1 | 1/2013 | Woodard | |
| 8,752,254 B2 * | 6/2014 | Perner | F16B 45/028 |
| | | | 24/600.1 |
| 9,453,527 B2 | 9/2016 | Yoo et al. | |
| 10,709,208 B2 | 7/2020 | Geist | |
| 10,750,730 B2 | 8/2020 | Gregory | |
| 2003/0221294 A1 | 12/2003 | Kakuda et al. | |
| 2004/0195900 A1 | 10/2004 | The et al. | |
| 2015/0291079 A1 | 10/2015 | Wright | |
| 2015/0321639 A1 * | 11/2015 | Horsefall | F16B 45/026 |
| | | | 24/600.9 |
| 2019/0075891 A1 * | 3/2019 | Geist | F16B 45/00 |
| 2020/0017016 A1 | 1/2020 | Christie | |
| 2020/0079251 A1 * | 3/2020 | van Essen | B60N 2/2872 |
| 2020/0288821 A1 | 9/2020 | Geist | |

FOREIGN PATENT DOCUMENTS

| | | |
|---|---|---|
| ES | 248782 U | 6/1980 |
| FR | 1400597 A | 5/1965 |
| FR | 1566630 A | 3/1969 |
| FR | 1587842 A | 3/1970 |
| FR | 2790361 A1 | 3/1999 |
| FR | 2904189 A3 | 7/2006 |
| GB | 225775 A | 12/1924 |
| GB | 378422 A | 8/1932 |
| GB | 511869 A | 8/1939 |
| GB | 604624 A | 7/1948 |
| GB | 2185171 A1 | 7/1987 |
| GB | 1153766 A | 7/1996 |
| JP | 2002012069 A | 1/2002 |
| JP | 2002159394 A2 | 6/2002 |

OTHER PUBLICATIONS

PCT, Int. App. No. PCT/US2022/071281 International Search Report, 4 pages, Jul. 6, 2022.

* cited by examiner

SNAP HOOK WITH CLIP INSERT

CROSS REFERENCE TO RELATED APPLICATIONS

This application is a continuation of International Patent Application Number PCT/US2022/071281, filed Feb. 23, 2022, which is hereby incorporated by reference. International Patent Application Number PCT/US2022/071281, filed Feb. 23, 2022, claims the benefit of U.S. Patent Application No. 63/268,194, filed Feb. 17, 2022, which are hereby incorporated by reference. International Patent Application Number PCT/US2022/071281, filed Feb. 23, 2022, claims the benefit of U.S. Patent Application No. 63/200,698, filed Mar. 23, 2021, which are hereby incorporated by reference.

BACKGROUND

Installing child safety seats or car seat in a vehicle can be a difficult process. The child safety seat is secured using straps and several different anchor points positioned at different locations in the vehicle. Some of these anchors may be located in the crevice between the seat and the seat back. Often, these anchors may be difficult to access as this crevice may not offer a large amount of space for a person attempting to anchor the car seat.

Thus, there is a need for improvement in this field.

SUMMARY

The unique clip grip snap hook snap hook system has been developed to tether or otherwise secure an object, such as a child safety seat, a car seat base, and/or booster seat, to an anchoring system, such as a Lower Anchors and Tethers for Children (LATCH) or other Isofix systems. The snap hook assembly incorporates a "J" hook design that is easy to engage and disengage from the Isofix or other anchor systems.

The snap hook system includes a shank with a hook portion on one end and a handle portion on an opposing end. The hook portion forms a pocket in which the anchor is secured, and the end of the hook portion forms a nose. A gate is secured to the shank at the handle portion. In one example, the gate is in the form of a bendable plastic member that is biased to engage the nose of the hook so as to enclose the pocket of the snap hook and prevent disengagement of the snap hook from an anchor point.

The snap hook system includes an insert. The insert is generally formed from a plastic material such as via injection molding. The insert includes a gate that extends from the insert. The gate extends through an opening in the handle of the shank. The insert is secured via a snap-fit type connection inside the opening in the shank. As should be appreciated, the insert and the shank are two (2) separate components. In one example, the insert and the shank are made from two (2) different materials. For example, the shank is made from a conductive material and the insert is made from an insulative material. In another example, the shank is made from metal and the insert is made from plastic. In one embodiment, the insert includes a tongue configured retain the insert within the opening of the shank. In one example, the gate is integrally formed with the insert such as via injection molding. Once the snap hook is assembled, the gate and the insert are generally located on opposing sides of the shank.

During development of the snap hook system, it was discovered that standard snap hooks require a user to press sharp metal spring to remove hook from the anchor point of the vehicle which can be quite painful. While disconnecting the snap hook, the finger of the user typically blocks the hook opening while trying to move the hook around an anchorage bar. The unique snap hook design provides an ergonomic insert to provide an intuitive touch-point to create full hook clearance for easy hook removal. In one form, the ergonomic insert is made of plastic so as to make the insert comfortable to the user. For instance, the insert includes a bowed portion configured to support a finger (and/or thumb). The gate includes an arched section configured to receive a finger which in turn prevents the finger from slipping and blocking the opening.

The plastic insert aids in pressing the hook into tight seat bites during installation. The snap hook further provides an ergonomic finger position on the gate and on the top of the insert so as to enhance finger position when pressing to open the hook. Vehicle cabins can become extremely hot from the sun, especially during summers. Consequently, components of the child safety seat can become likewise hot. By the grip being made of plastic, the insert insulates the finger of the user against the hot J hook which is typically made from conductive metal. The gate and insert are an integrated unit that can be inserted or clipped to the hook. For instance, the gate and insert can be made of injection molded plastic. The plastic gate provides a smooth, comfortable surface to press as compared to traditional metal gates which can have sharp edges. When pressed, the tip of gate or lever contacts an inner hook surface. The gate provides a ramp surface to facilitate clipping, and the gate is configured to provide a fully open area for easily removing hook from an anchor.

In one form, the hook is made of a solid stamped metal part. The hook in this form provide a high tensile and dynamic strength (e.g., 2100 pound-force (lbf)) for standard LATCH applications. The snap hook provides a compact, low-weight design. The snap hook further provides ease-of-use including off-angle friendly web adjustments. The ergonomic touch-point on the snap hook facilitates easier installations in tight seat bights. The easy-release design of the snap hook protects fingers from the anchorage bar area.

In another form, the hook is made from a metal wire bent to form the hook. In this case, the snap hook available with at least 1700 lbf capability for rear-facing-only applications. The snap hook assembly incorporates a wire-form "J" hook design that is easy to engage and disengage from the LATCH system. Typically, car seat anchor hooks are formed by stamping and bending sheet metal, which leads to a loss of material as waste. As should be appreciated, the loss of material due to waste leads to increased manufacturing cost, which is then passed on to the customer.

The snap hook assembly includes a hook on one end and a handle portion on an opposing end. The hook forms a pocket in which the LATCH system anchor is secured, and the end of the hook portion forms a nose. A gate in the form of a spring is secured to a removable insert of the assembly. In one example, the gate is in the form of a metal strip that is biased to engage the nose of the hook so as to enclose the pocket of the snap hook and prevent disengagement of the snap hook from the LATCH system.

The snap hook assembly is formed from a unitary piece of metallic wire. The hook portion is formed of double thick wire and the handle portion is formed of single thick wire. As should be appreciated, the hook portion is formed of double thick wire to increase strength. As has been mentioned previously, the hook portion is generally in the form of a "J" style hook while the handle portion is in the form of a rectangular and/or "T" shaped handle. In one embodiment, the wire has a circular cross-section. In other embodiments, the wire may have a rectangular, polygonal, and/or other cross-sectional shape.

As was mentioned above, the snap hook assembly includes a removable insert. The insert is generally formed from a plastic material. However, in other examples, the insert is made from a metallic and/or other material. The insert is configured to nest within the handle and is secured via a snap-fit type connection. In one embodiment, the insert includes a tongue portion configured retain the insert within the handle. In one example, the gate is integral to the insert. In other examples, the gate is removable from the insert via the snap-fit connection.

The gate includes extends from the insert to the nose portion of the hook. In one embodiment, the gate defines a curved shape. However, in other embodiments, the gate may be straight, and/or any other shape. The gate is mounted to the grip component at a fixed end and includes a free end biased to rest against an inner surface of the nose portion of the hook. As should be appreciated, the gate is operable between a first, closed, position and a second, open, position. In the closed position, the free end of the gate is biased against the nose portion of the hook preventing access to the pocket of the hook. In the open position, force is applied to the gate to form a gap between the free end and the nose portion. When in the open position an anchor, for example a LATCH anchor, may be inserted through the gap and into the pocket.

By the insert being made of plastic, numerous color options are available for user touch-points. The adjuster button is configured for pad printing available for logos or other branding if desired. The overall snap hook system is compatible with multiple web options based on application needs.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a snap hook.

Aspect 3 generally concerns the system of any previous aspect in which the snap hook includes a hook.

Aspect 4 generally concerns the system of any previous aspect in which the hook is made of metal.

Aspect 5 generally concerns the system of any previous aspect in which the hook is made from stamped metal.

Aspect 6 generally concerns the system of any previous aspect in which the hook is made from a bent metal wire.

Aspect 7 generally concerns the system of any previous aspect in which the snap hook includes a clip insert.

Aspect 8 generally concerns the system of any previous aspect in which the clip insert coupled to the hook body via a snap-fit connection.

Aspect 9 generally concerns the system of any previous aspect in which the hook body defines an opening configured to receive the clip insert.

Aspect 10 generally concerns the system of any previous aspect in which the clip insert defines a belt opening through which a belt is looped.

Aspect 11 generally concerns the system of any previous aspect in which the clip insert is made of plastic.

Aspect 12 generally concerns the system of any previous aspect in which the clip insert includes a ramp portion configured to support a finger.

Aspect 13 generally concerns the system of any previous aspect in which the clip insert includes a gate configured to open and close the hook.

Aspect 14 generally concerns the system of any previous aspect in which the clip insert includes a clip tongue configured to clip to the opening in the hook body.

Aspect 15 generally concerns the system of any previous aspect in which the gate extends from the clip insert and through the opening in the hook body.

Aspect 16 generally concerns the system of any previous aspect in which the gate includes an arched section configured to receive a finger.

Aspect 17 generally concerns the system of any previous aspect in which the snap hook is configured to secure to an Isofix anchor.

Aspect 18 generally concerns the system of any previous aspect in which the snap hook is configured to secure a child safety seat.

Aspect 19 generally concerns the system of any previous aspect in which the hook body.

Aspect 20 generally concerns the system of any previous aspect in which the hook body has a hook.

Aspect 21 generally concerns the system of any previous aspect in which the clip insert includes an integral gate configured to open and close the hook.

Aspect 22 generally concerns the system of any previous aspect in which the gate includes a free end configured to contact the hook.

Aspect 23 generally concerns the system of any previous aspect in which the hook includes a rounded nose portion.

Aspect 24 generally concerns the system of any previous aspect in which the hook includes a foot portion configured to interface with the free end of the gate to close the hook.

Aspect 25 generally concerns the system of any previous aspect in which the hook defines a pocket configured to receive an anchor point.

Aspect 26 generally concerns the system of any previous aspect in which the free end includes an angled surface configured to guide the anchor point into and out of the pocket.

Aspect 27 generally concerns the system of any previous aspect in which the gate is arranged parallel with the hook body when in a closed position.

Aspect 28 generally concerns the system of any previous aspect in which the clip insert includes a groove configured to receive a first edge of the hook body.

Aspect 29 generally concerns the system of any previous aspect in which the clip insert includes a prong configured to snap-fit around a second edge of the hook body.

Aspect 30 generally concerns the system of any previous aspect in which the clip insert includes a pair of finger grooves configured to enable a user to remove the clip insert from the hook body.

Aspect 31 generally concerns the system of any previous aspect in which the gate is made of plastic.

Aspect 32 generally concerns the system of any previous aspect in which the hook and the clip insert are made from two different materials.

Aspect 33 generally concerns the system of any previous aspect in which the hook is made from a conductive material.

Aspect 34 generally concerns the system of any previous aspect in which the clip insert is made from an insulative material.

Aspect 35 generally concerns the system of any previous aspect in which the snap hook has at least one portion made of wire.

Aspect 36 generally concerns the system of any previous aspect in which the snap hook has a hook body made entirely from a single piece of the wire.

Aspect 37 generally concerns the system of any previous aspect in which the wire bends to form a hook of a hook body.

Aspect 38 generally concerns the system of any previous aspect in which the clip insert includes a spring holder.

Aspect 39 generally concerns the system of any previous aspect in which the wire is bent to form an opening in the hook body where the spring holder for holding a keeper spring is secured.

Aspect 40 generally concerns the system of any previous aspect in which the hook body includes two ends of the wire bent to form the hook.

Aspect 41 generally concerns the system of any previous aspect in which the ends of the wire are tack-welded together at the hook to contact one another.

Aspect 42 generally concerns the system of any previous aspect in which the spring holder is secured in the opening via snap-fit connection.

Aspect 43 generally concerns the system of any previous aspect in which the snap-fit connection includes a snap notch where the wire is received.

Aspect 44 generally concerns the system of any previous aspect in which the spring holder defines a belt passage through which a belt is looped.

Aspect 45 generally concerns the system of any previous aspect in which the belt is looped in the belt passage opposite the snap-fit connection to retain the spring holder to the hook body.

Aspect 46 generally concerns the system of any previous aspect in which the spring holder has a tongue extending in a longitudinal direction to retain the spring holder on the hook body.

Aspect 47 generally concerns the system of any previous aspect in which the spring holder is made of plastic.

Aspect 48 generally concerns the system of any previous aspect in which the keeper spring is a metallic spring.

Aspect 49 generally concerns the system of any previous aspect in which the wire has a circular cross-section.

Aspect 50 generally concerns the system of any previous aspect in which the snap hook forms a tether anchor for a child restraint system in a vehicle.

Aspect 51 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
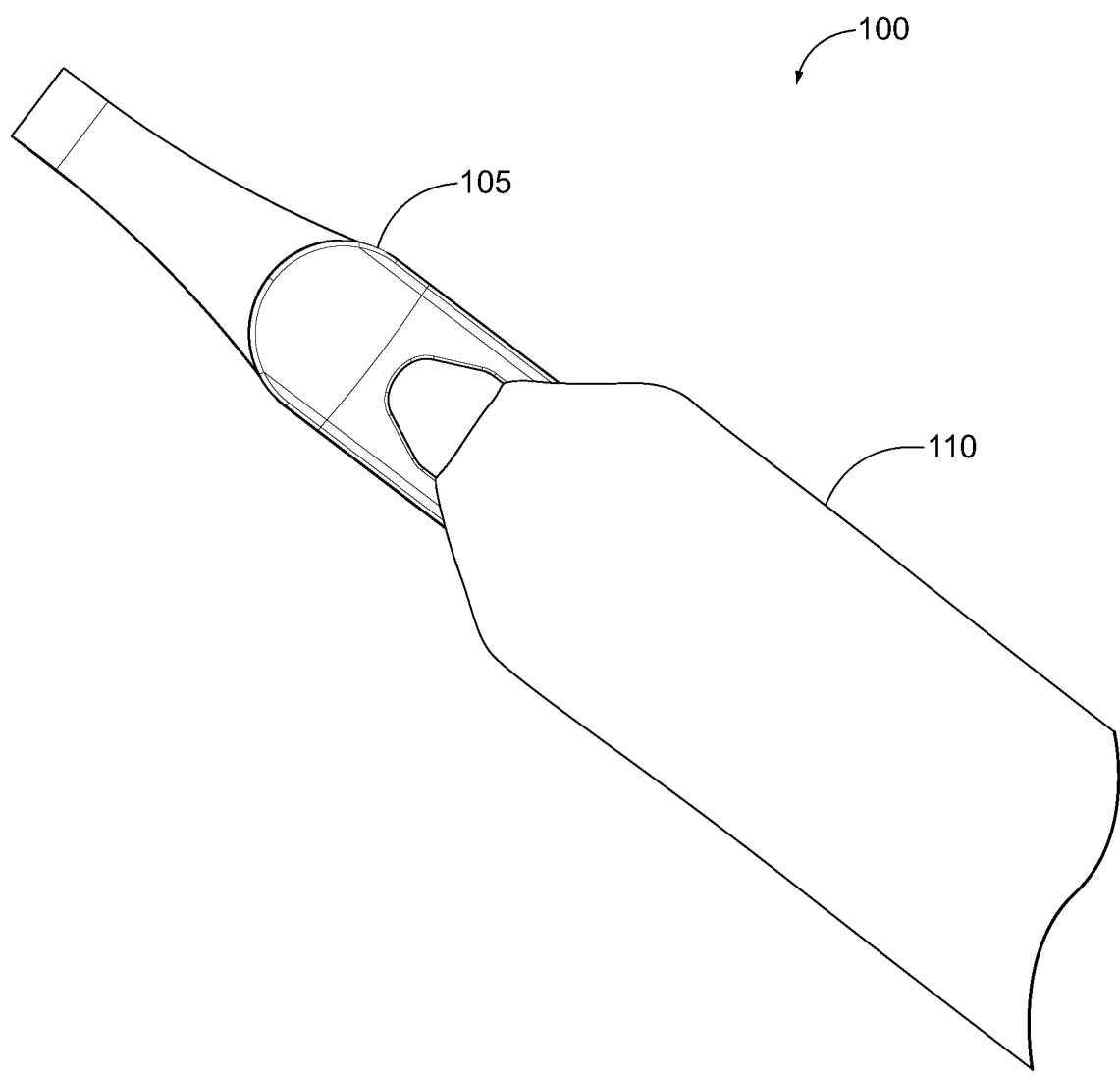
FIG. 1 is a perspective view of a restraint system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Child car seats are secured to the seat of a vehicle using a system of belts and hooks that attach to different anchor points on the vehicle seats. These anchor points may be hidden within the upholstery of the seats as they could be uncomfortable for a person sitting on the seat without a car seat. Because the anchor points may be hidden within the seats, it may become challenging to attach a hook to the anchor. Often, the anchor may not be able to be seen or may be difficult to reach.

Figure 2:
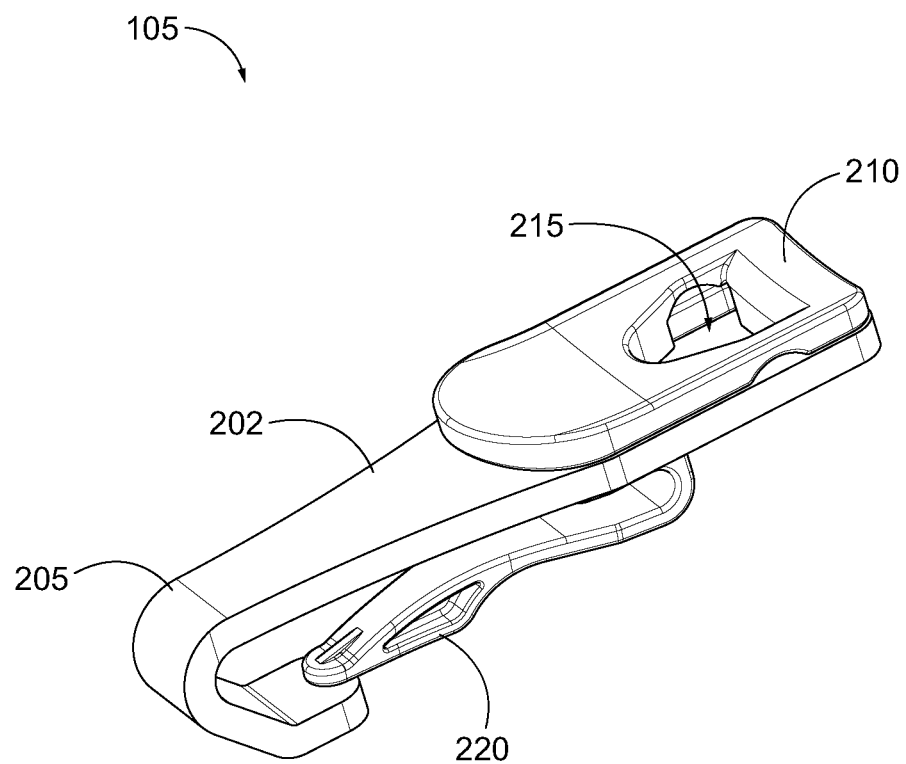
FIG. 2 is a top perspective view of a snap hook of the restraint system of FIG. 1.
Figure 3:
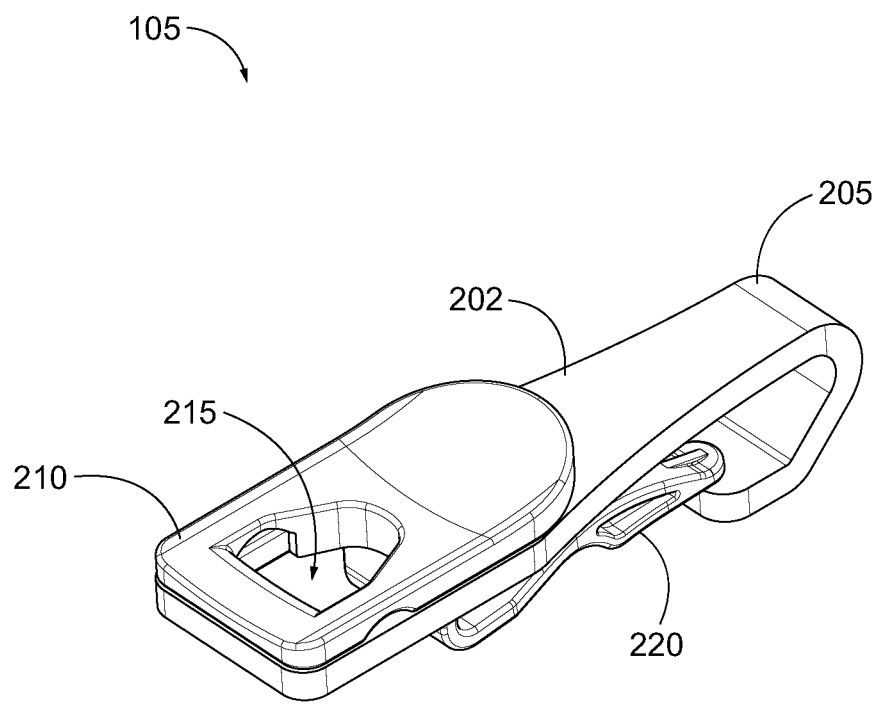
FIG. 3 is a rear perspective view of the snap hook of FIG. 2.
Figure 4:
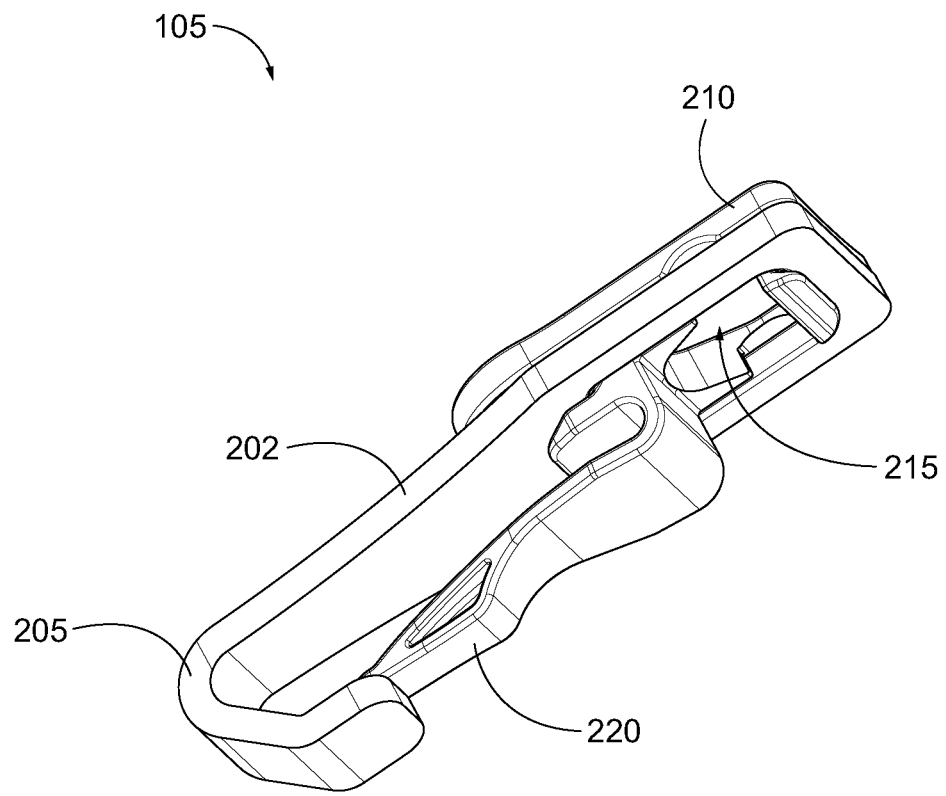
FIG. 4 is a bottom perspective view of the snap hook of FIG. 2.
Figure 5:
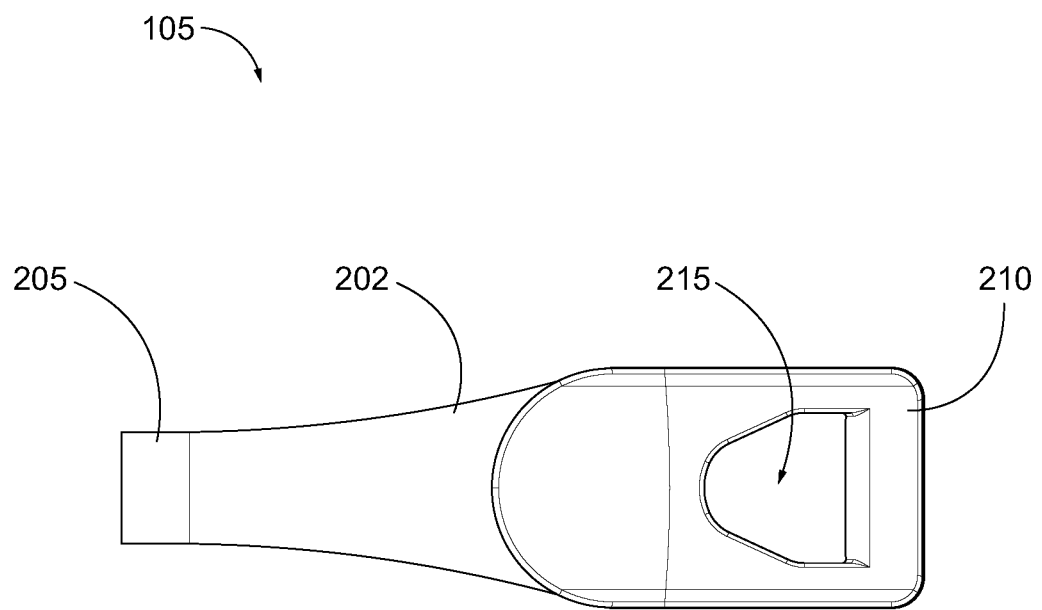
FIG. 5 is a top view of the snap hook of FIG. 2.
Figure 6:
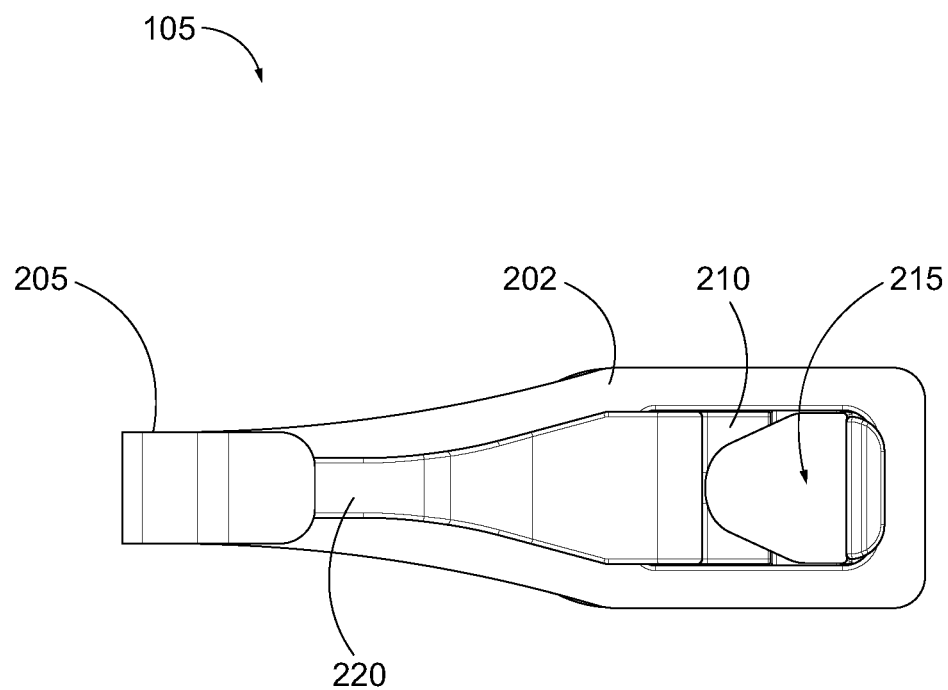
FIG. 6 is a bottom view of the snap hook of FIG. 2.
Figure 7:
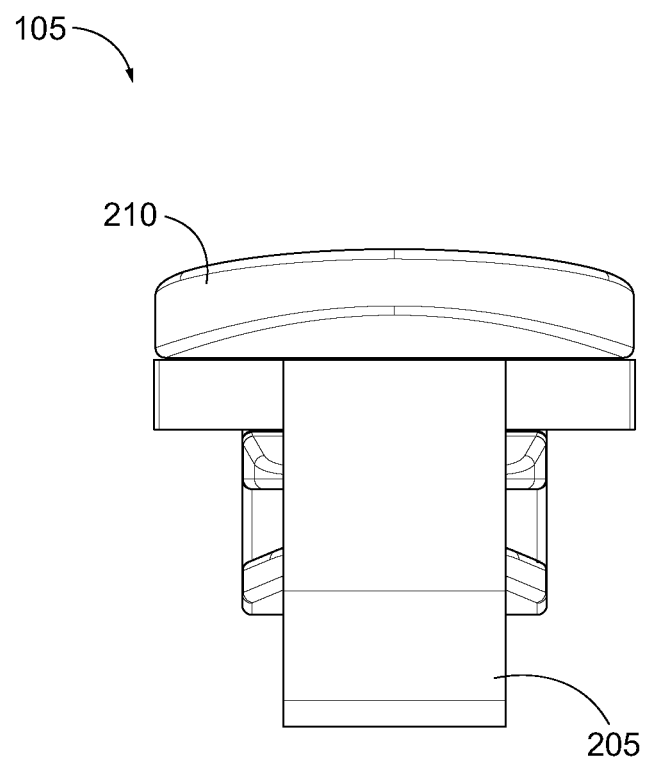
FIG. 7 is a front view of the snap hook of FIG. 2.
Figure 8:
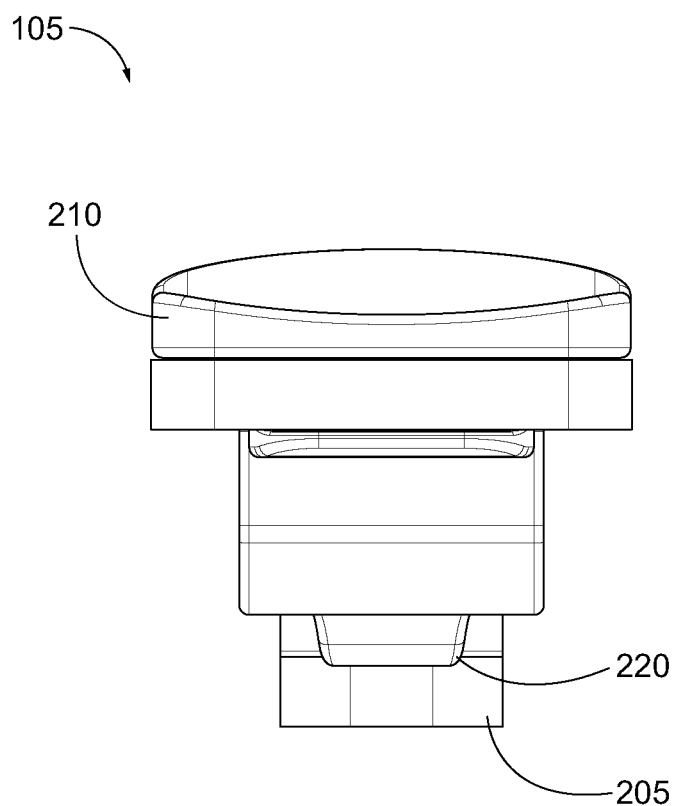
FIG. 8 is a rear view of the snap hook of FIG. 2.
Figure 9:
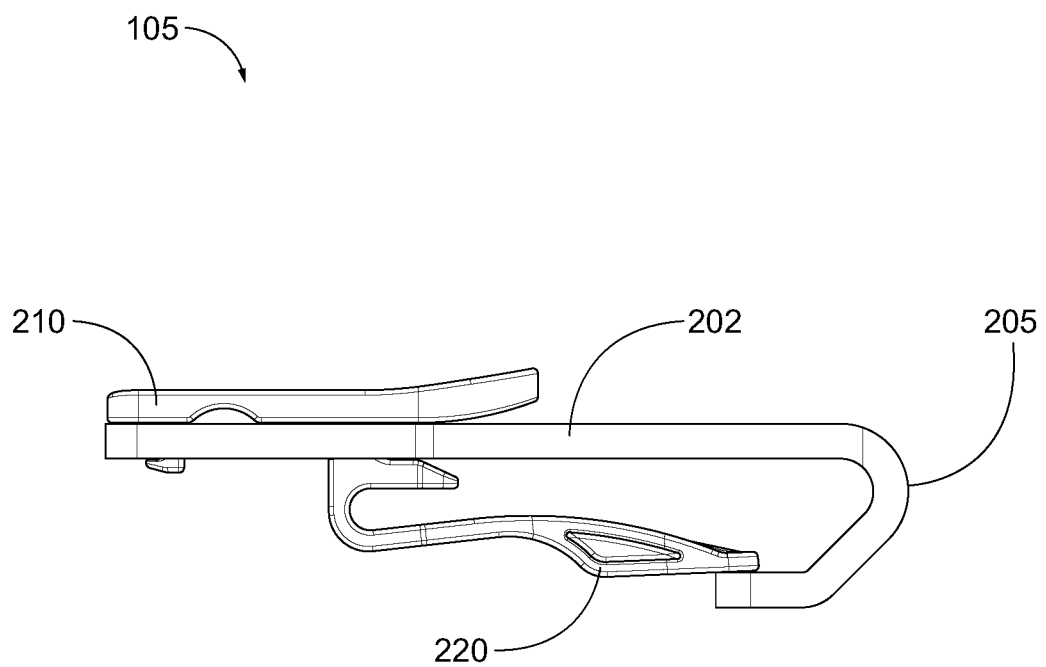
FIG. 9 is a first side view of the snap hook of FIG. 2.
Figure 10:
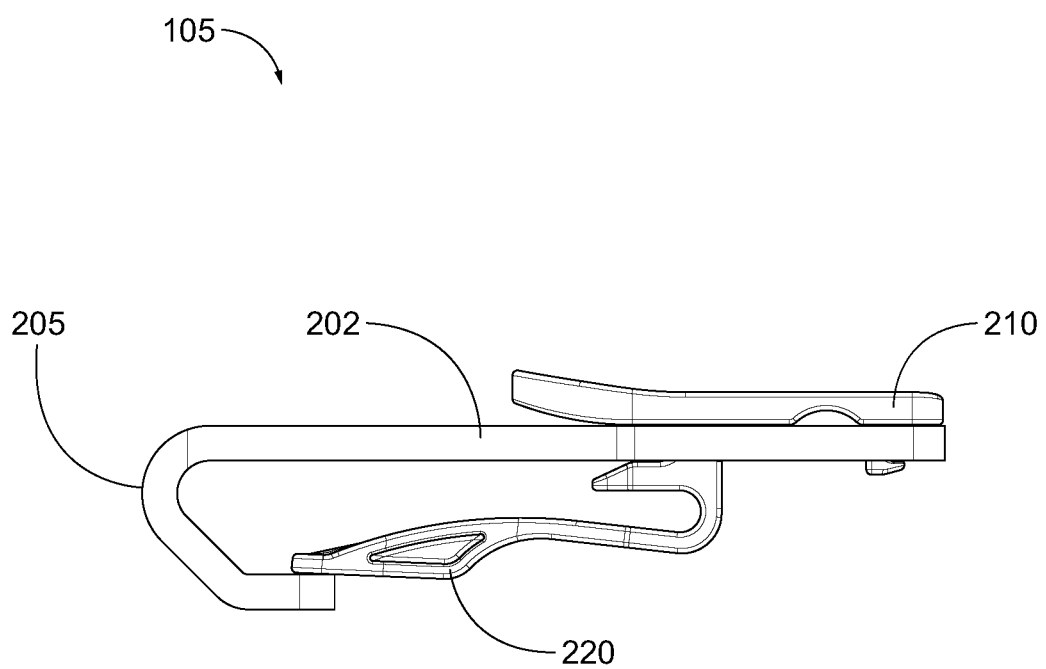
FIG. 10 is a second side view of the snap hook of FIG. 2.

FIG. 1 shows a perspective view of a restraint system 100 for securing a child car seat to an anchor on the seat of a vehicle. The restraint system 100 includes a snap hook 105 and a belt 110. The belt 110 is configured to attach to the snap hook 105 in order to secure the snap hook 105 to the child car seat. For example, the belt 110 loops through the snap hook 105 to secure the belt 110 to the snap hook 105. In another example, the belt 110 is stitched and/or clamped to the snap hook 105 to secure the belt 110 to the snap hook 105. In one example, the belt 110 is in the form of tubular webbing. In other examples, the belt 110 is in the form of rope, cable, string, wire, chain, and/or any other suitable attachment material. The snap hook 105 is further configured to serve as an attachment point between the child car seat and one or more anchors on the vehicle. For example, the snap hook 105 is configured to serve as a method of attaching and/or detaching the child car seat from an IS OFIX system.

FIGS. 2, 3, 4, 5, 6, 7, 8, 9, and 10 show multiple different views of the snap hook 105. The snap hook 105 includes a hook body 202 with a hook 205 at one end. In one example, the hook 205 is in the form of a J-hook. In other examples, the hook 205 has a different shape, such as in the form of a square and/or angled hook. In some embodiments, the hook body 202 is made of a metal, such as steel, that provides enough strength to stay attached to the anchor on the vehicle seat without breaking in the event of a wreck or other sudden movements of the vehicle. In one example, the hook 205 is stamped metal with a high tensile and dynamic strength (e.g., 2100 pound-force (lbf)) for standard ISOFIX applications. The hook body 202 is further configured to receive and secure a clip insert 210. The clip insert 210 fits through an opening in the hook body 202 so that a portion of the clip insert 210 is positioned on one side of the hook body 202 and a portion of the clip insert 210 is positioned on the other side of the hook body 202. The clip insert 210 defines a belt opening 215. The belt opening 215 is configured to receive and secure a belt as shown in FIG. 1. As should be appreciated, the clip insert 210 and the hook body 202 are two separate components of the snap hook 105. In one example, the hook body 202 and the clip insert 210 are made from different materials. For example, the hook body 202 is made from a conductive material and the clip insert 210 is made from an insulative material. Thus, in a hot vehicle, the clip insert 210 does not transfer heat to a user like the hook body 202. In another example, the hook body 202 is made from metal and the clip insert 210 is made from plastic. As the clip insert 210 is made from plastic, a user is less likely to experience a burn and/or discomfort when using the snap hook 105. Additionally, as the clip insert 210 is made from plastic, the clip insert 210 can be injection molded to safe on manufacturing costs.

The clip insert 210 includes a gate 220. In one example, the gate 220 is integral to the clip insert 210, such that the clip insert 210 and the gate 220 are injection molded together as a unitary component. The gate 220 extends from one side of the clip insert 210 to the hook 205. The gate 220 is configured to enable a user to securely attach and/or detach the snap hook 105 from an anchor point. For example, the gate 220 prevents the snap hook 105 from accidentally detaching from the anchor point. The gate 220 is an integral component of the clip insert 210. For example, the clip insert 210 and the gate 220 are a single molded component. In one example, the clip insert 210 is made from a resilient material, allowing the gate 220 to actuate with respect to the clip insert 210. For example, the clip insert 210 is made from plastic. In another example, the clip insert 210 is made from any desired rigid material, such as plastic and/or a metal like steel and/or aluminum. As should be appreciated, vehicle cabins can become extremely hot from the sun, especially during summers. Consequently, components of the child safety seat can become likewise hot. By the clip insert 210 being made of plastic, the clip insert 210 insulates the finger of the user against the hot hook body 202 which is typically made from conductive metal. Additionally, by the gate 220 being made from plastic, the user avoids contact with conductive metal and/or potentially sharp components.

Figure 11:
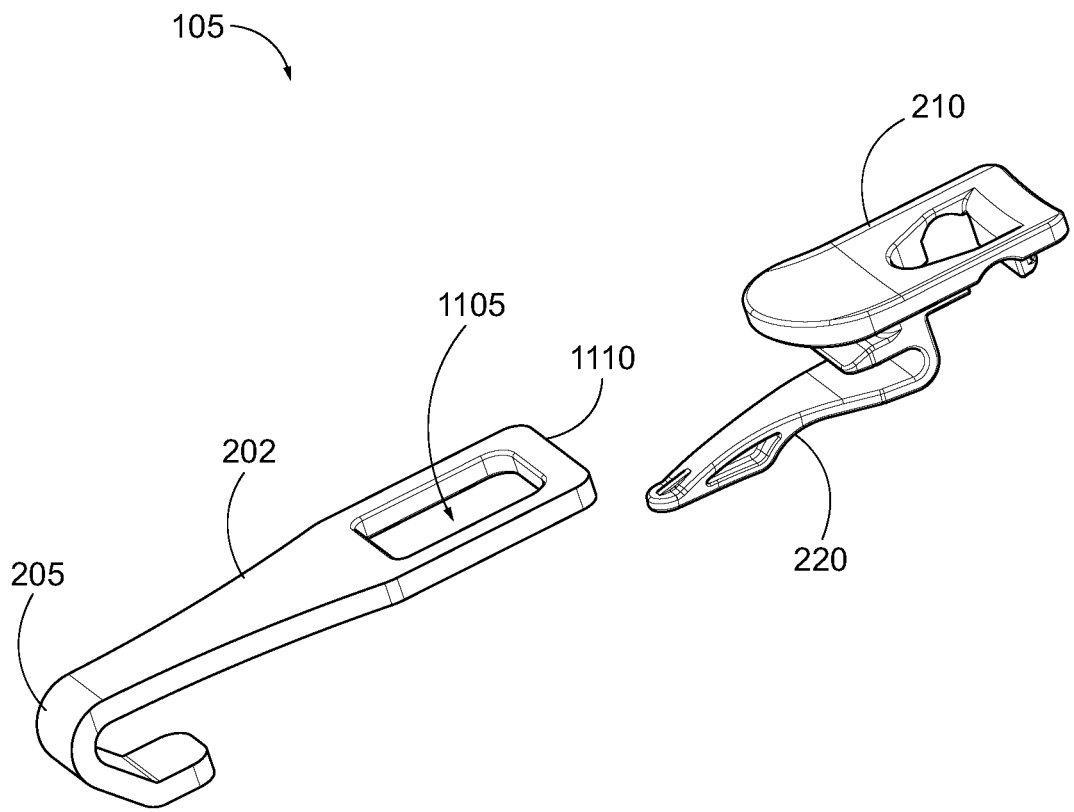
FIG. 11 is an exploded view of the snap hook of FIG. 2.
Figure 12:
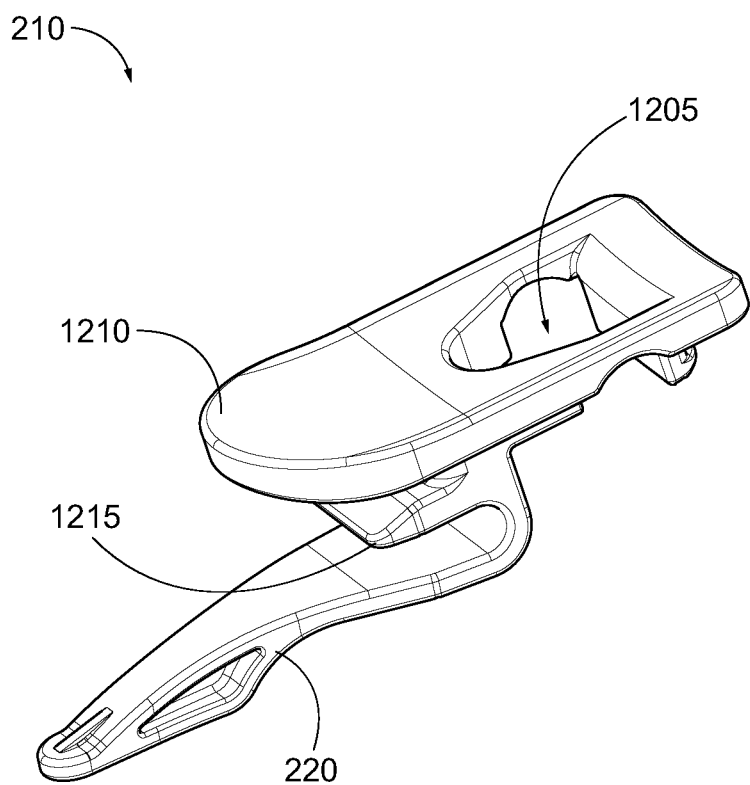
FIG. 12 is a perspective view of a clip insert of the snap hook of FIG. 2.

FIG. 11 shows an exploded view of the snap hook 105. As can be seen in FIG. 11, the hook body 202 includes an opening 1105 defined by a handle portion 1110 of the hook body 202. The opening 1105 is sized to be able to receive a strap, web, band, buckle or other type of securement device for connecting the restraint system 100 to a car seat and/or other object. The opening 1105 is further configured to receive the clip insert 210 as discussed previously. For example, the clip insert 210 is configured to snap-fit within the opening 1105 of the hook body 202. As should be appreciated, the clip insert 210 is removable from the opening 1105 in the event that the clip insert 210 breaks and/or a heavier duty hook body 202 and/or clip insert 210 is required.

FIGS. 12, 13, 14, and 15 show different views of the clip insert 210 and the hook body 202. The clip insert 210 includes an opening 1205 configured to align with the opening 1105 to form the belt opening 215. As should be appreciated, the belt passes through both the opening 1105 and the opening 1205 when passing through the belt opening 215. Thus, the clip insert 210 is further secured within to the hook body 202 via the belt tension. The clip insert 210 further includes a tongue portion 1210 and a post 1215. The tongue portion 1210 extends outward from the clip insert 210 to serve as a ramp portion 1315. The ramp portion 1315 is configured to prevent the fingers of a user from slipping off of the clip insert 210 during attachment and/or detachment of the snap hook 105. The post 1215 further includes a guide edge 1340. The guide edge 1340 is configured to guide the clip insert 210 into the opening 1105 during a snap-fit connection of the clip insert 210 and the hook body 202. The tongue portion 1210 and the post 1215 together form a groove 1305. The groove 1305 is configured to receive a first edge 1405 of the hook body 202 via a snap-fit type connection.

The clip insert 210 further includes a prong 1310. The prong 1310 is configured to extend through the opening 1105 of the hook body 202 and engage a second edge 1410 of the hook body 202 via a snap-fit type connection. In one example, to insert the clip insert 210 into the opening 1105, a user begins by inserting the gate 220 through the opening 1105. The user then aligns the groove 1305 with the first edge 1405 of the hook body 202, such that the tongue portion 1210 is on a first side 1415 of the hook body 202 and the post 1215 is on a second side 1502 of the hook body 202. The guide edge 1340 of the post 1215 then guides the first edge 1405 into the groove 1305. The user then rotates the clip insert 210 into the opening 1105 such that the prong 1310 snaps around the second edge 1410 of the hook body 202. At this stage, the clip insert 210 is secured within the opening 1105 of the hook body 202 and the snap hook 105 is assembled. To remove the clip insert 210 from the opening 1105, the clip insert 210 includes a pair of opposing finger grooves 1330. The finger grooves 1330 are configured to enable a user to position one or more fingers within the finger grooves 1330 and apply rotational force as shown by arrow 1335 to remove the clip insert 210 from the opening 1105.

Figure 13:
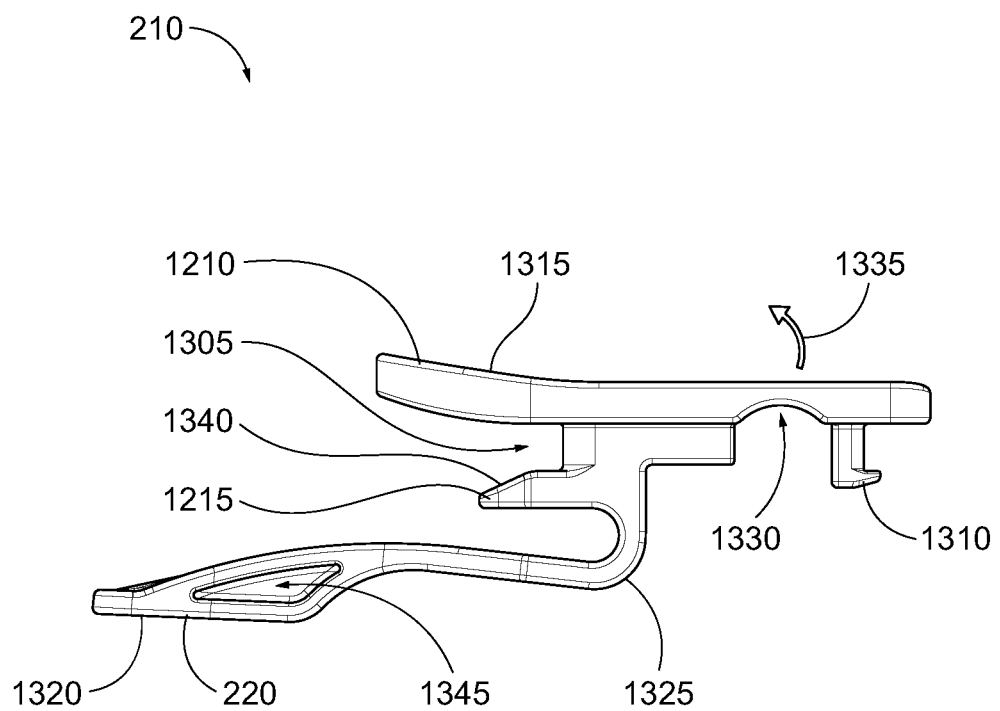
FIG. 13 is a side view of the clip insert of FIG. 12.
Figure 14:
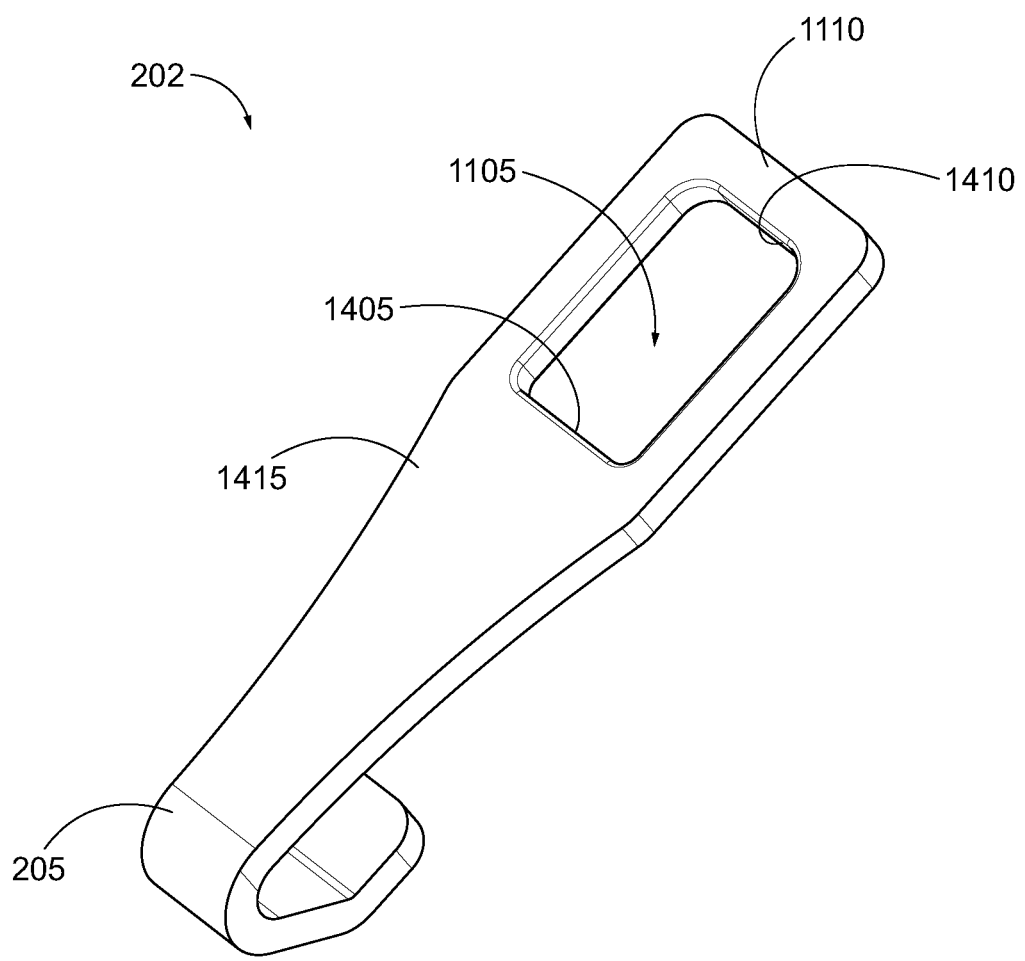
FIG. 14 is a perspective view of a hook body of the snap hook of FIG. 2.

As can be seen best in FIG. 13, the gate 220 includes an angled surface 1320 configured to enable easy attachment and/or detachment of the snap hook 105 from an anchor. For example, the angled surface 1320 is generally a smooth surface configured to enable an anchor to easily slide into and/or out of the hook 205. In another example, the angled shape of the angled surface 1320 guides the anchor into and/or out of the hook 205. The gate 220 further includes a bend portion 1325. The bend portion 1325 is configured as a fulcrum and/or rotation axis of the gate 220. For example, when a user applies force to the gate 220, the gate 220 begins to rotate about the bend portion 1325. Additionally, the bend portion 1325 is configured to enable the gate 220 to have a generally parallel arrangement with the hook body 202. For example, the gate 220 and the hook body 202 are generally parallel to one another when the gate 220 is in a closed position. In one example, the gate 220 includes at least one cutout 1345. The cutout 1345 is configured to increase weight savings and/or flexibility of the gate 220.

Figure 15:
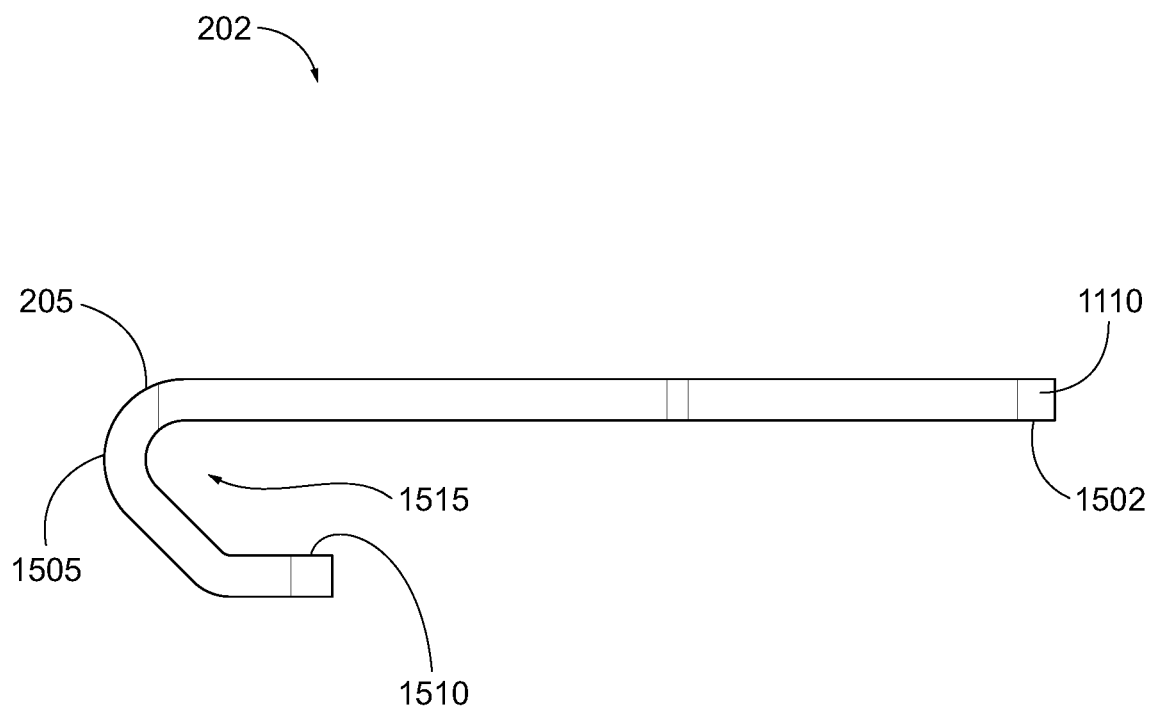
FIG. 15 is a side view of the hook body of FIG. 14.

As can best be seen in FIG. 15, the hook body 202 includes the hook 205. The hook 205 extends into a nose 1505. The nose 1505 is generally rounded such that a user is able to insert the snap hook 105 into tight and/or small areas for attachment. In other examples, the nose 1505 is square, triangular, and/or polygonal. The nose 1505 extends into a foot 1510. As will be discussed in more detail later, the foot 1510 is configured to interface with the gate 220 of the clip insert 210 to prevent accidental detachment of an anchor from the snap hook 105. The hook 205 is configured to define a pocket 1515. The pocket 1515 is configured to secure the anchor of the vehicle.

Figure 16:
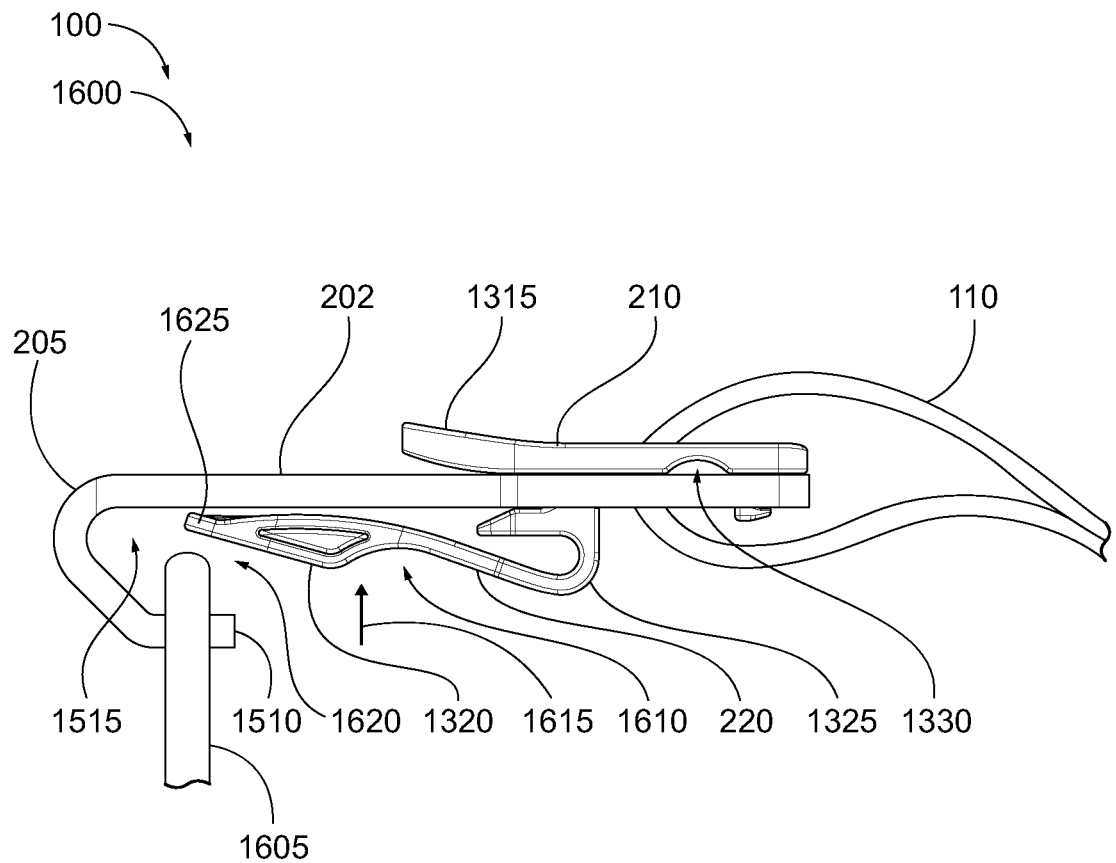
FIG. 16 is a side view of the restraint system in an open position.
Figure 17:
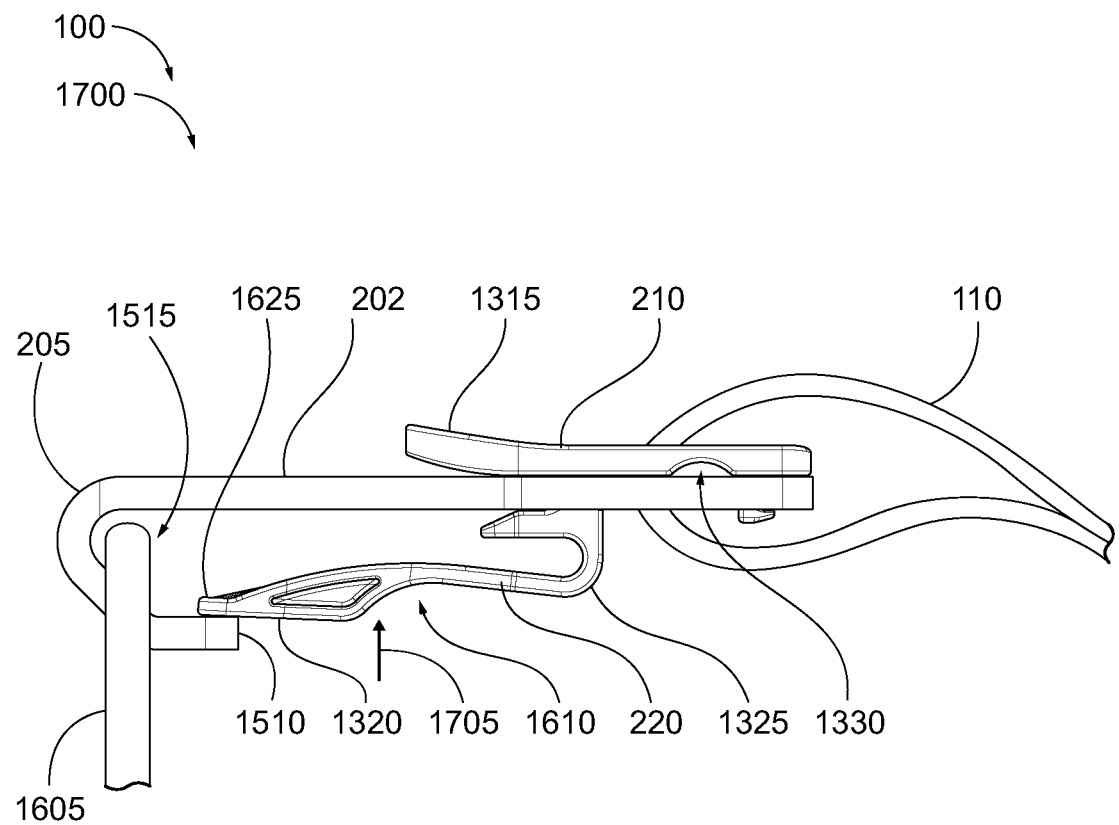
FIG. 17 is a side view of the restraint system in a closed position.

FIGS. 16 and 17 illustrate how the restraint system 100 is attached to an anchor point 1605 of a vehicle seat to secure a car seat to the vehicle seat. FIG. 16 shows the restraint system 100 in an open position 1600. In the open position 1600, the gate 220 is raised above the foot 1510 of the hook 205 so that a gap 1620 between the gate 220 and the foot 1510 is large enough to allow anchor point 1605 to pass between. To actuate the gate 220 into the open position 1600 a user generally applies force as shown by arrow 1615 to the gate 220. In one example, the user aligns fingers and/or other actuation mechanisms with an arched portion 1610 of the gate 220. The arched portion 1610 is configured to conveniently hide and/or protect the fingers of a user from being scraped and/or injured when attaching the restraint system 100. As can be seen by arrow 1615, as a user applies force to the gate 220, a free end 1625 of the gate 220 moves from contact with the foot 1510 to forming a gap 1620 between the foot 1510 and the free end 1625. Once the anchor point 1605 has been inserted through gap 1620 so that the anchor point 1605 is within the pocket 1515, the force applied to the gate 220 may be released. The biasing force of the gate 220 causes the gate 220 to rotate away from the bottom surface of the hook body 202 so that the restraint system 100 returns to a closed position 1700 (shown in FIG. 17).

In the closed position 1700, shown in FIG. 17, the anchor point 1605 is trapped within the pocket 1515 formed between the hook 205 of the hook body 202 and the gate 220. The removal of the gap 1620 between the gate 220 and the hook 205 keeps anchor point 1605 within the pocket 1515 and prevents anchor point 1605 from being disengaged from the restraint system 100. To remove the anchor point 1605 from the restraint system 100, the process shown in FIGS. 16 and 17 is repeated. A user applies force as shown by arrow 1705 to cause the gate 220 to rotate toward the bottom surface of the hook body 202 and create the gap 1620 between the gate 220 and the hook 205. The user then moves the restraint system 100 while the gate 220 is in the open position 1600 so that the anchor point 1605 moves out of the pocket 1515 and through the gap 1620 until the anchor point 1605 is clear of the foot 1510 of the hook 205. Once the anchor point 1605 is clear of the hook 205, the user releases the force on the gate 220 to return the restraint system 100 to the closed position 1700. As should be appreciated, the arched portion 1610 assists a user in removing the anchor point 1605 from the pocket 1515. For example, the arched portion 1610 enables a user to hide and/or mitigate finger interaction with the gap 1620 as the anchor point 1605 is removed.

Figure 18:
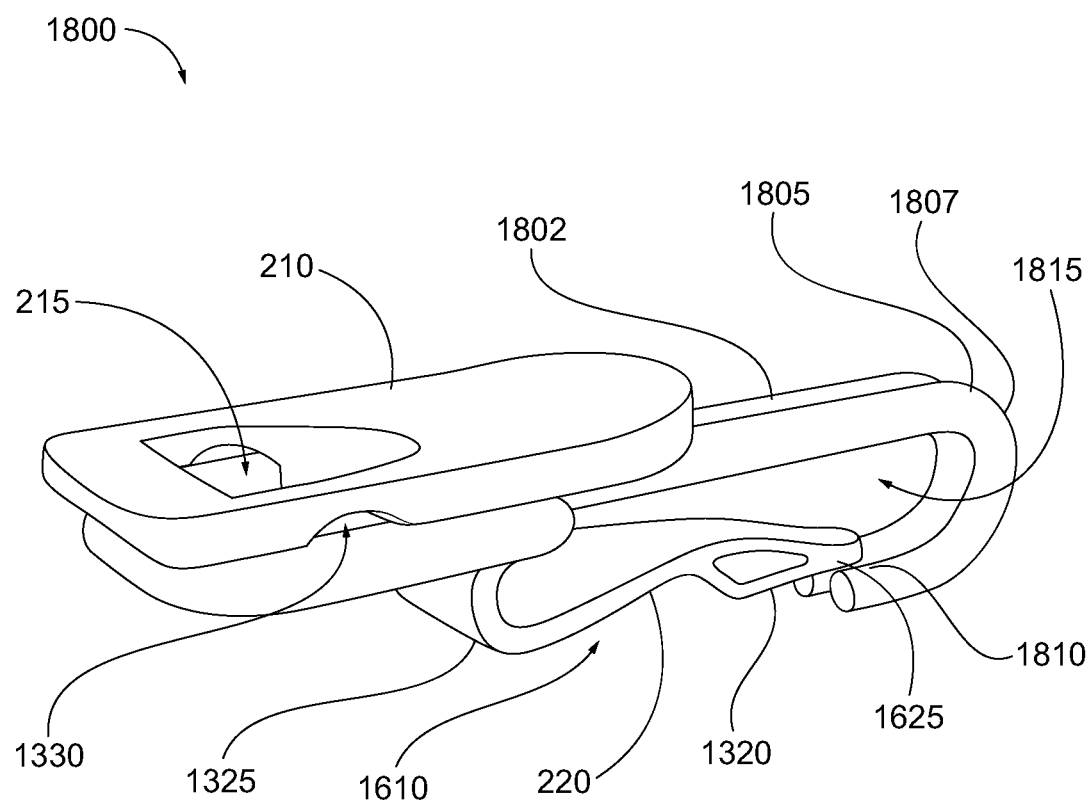
FIG. 18 is a rear perspective view of another embodiment of a snap hook.

FIG. 18 shows an example of another embodiment of a snap hook 1800. The snap hook 1800 of FIG. 18 includes the same clip insert 210 as the snap hook 105 of FIGS. 1-17. However, the snap hook 1800 of FIG. 18 includes a wire-form hook body 1802. The wire-form hook body 1802 is configured to decrease material waste as opposed to a stamped body assembly. The wire-form hook body 1802 includes a hook 1805 extending into a nose 1807. The hook 1805 further includes a foot 1810 configured to work with the gate 220 to block access to a pocket 1815. The hook 1805 and the foot 1810 function in the same manner as the components described previously, but are made from wire instead of stamped metal.

For example, the snap hook 1800 incorporates a wire-form "J" hook design that is easy to engage and disengage from an ISOFIX system. Typically, car seat anchor hooks are formed by stamping and bending sheet metal, which leads to a loss of material as waste. As should be appreciated, the loss of material due to waste leads to increased manufacturing cost, which is then passed on to the customer. The snap hook 1800 is formed from a unitary piece of metallic wire. The hook 1805 is formed of double thick wire and a handle portion is formed of single thick wire. As should be appreciated, the hook 1805 is formed of double thick wire to increase strength. As has been mentioned previously, the hook 1805 is generally in the form of a "J" style hook while the handle portion is in the form of a rectangular and/or "T" shaped handle. In one embodiment, the wire has a circular cross-section. In other embodiments, the wire may have a rectangular, polygonal, and/or other cross-sectional shape.

Figure 19:
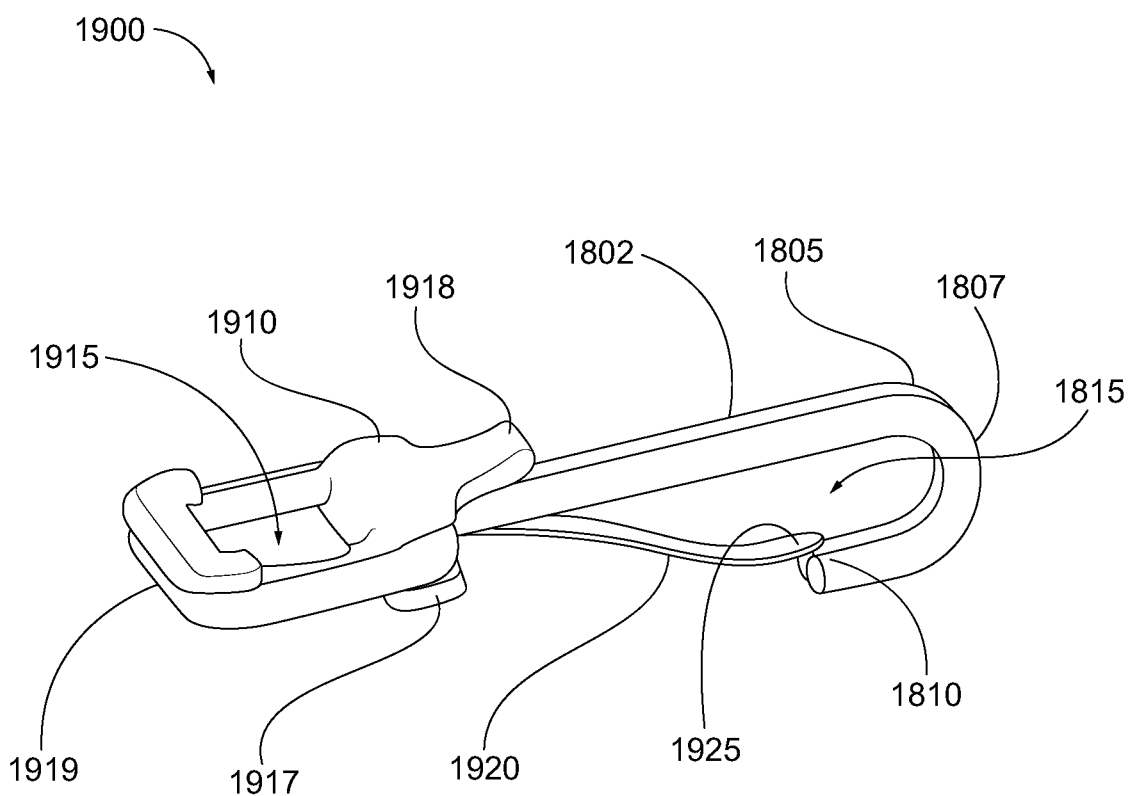
FIG. 19 is a perspective view of another embodiment of a snap hook.

FIG. 19 shows an example of another embodiment of a snap hook 1900. The snap hook 1900 of FIG. 19 includes the same hook body 1802 as the snap hook 1800 of FIG. 18. However, the snap hook 1900 of FIG. 19 includes a different clip insert 1910. The clip insert 1910 of the snap hook 1900 includes a belt opening 1915 configured to receive a belt, webbing, cable, and/or other fastener. The belt opening 1915 is further configured to be surrounded by the belt when the snap hook 1900 is used, such that tension on the belt secures the clip insert 1910 to the hook body 1802. The clip insert 1910 further includes a groove 1917. The groove 1917 is configured to enable a snap-fit of the clip insert 1910 to the hook body 1802. For example, the groove 1917 surrounds a portion of the hook body 1802 and the clip insert 1910 is held in place via a tongue 1918 and a ledge 1919. As was described previously, the ledge 1919 is configured to be surrounded by the belt and held in position via tension from the belt. The tongue 1918 is configured to prevent rotation of the ledge 1919 away from contact with the hook body 1802. The clip insert 1910 further includes a gate 1920 with a free end 1925 in contact with the foot 1810. The gate 1920 may be removable from the clip insert 1910 and/or an integral component of the clip insert 1910. For example, the clip insert 1910 and the gate 1920 may be a unitary molded component, such as resilient plastic material. In another example, the clip insert 1910 may be a plastic material and the gate 1920 may be a removable metallic material.

Figure 20:
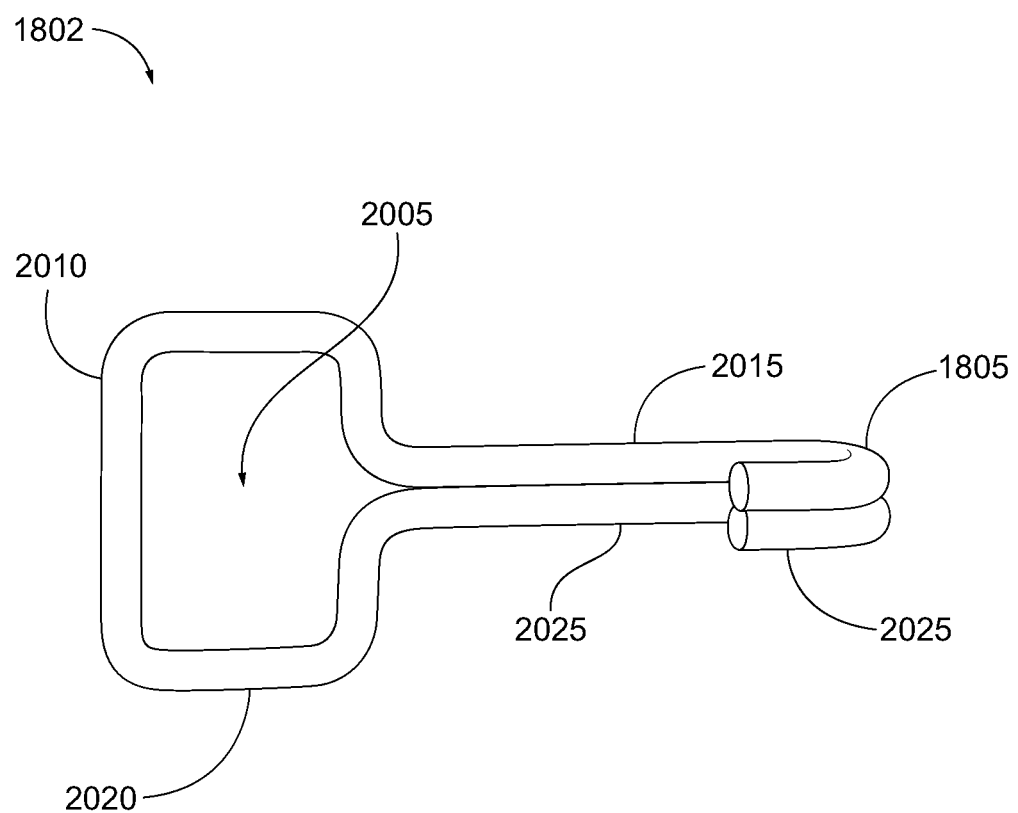
FIG. 20 is a bottom view of the hook body of FIG. 18.

Turning to FIG. 20, an example of the hook body 1802 is shown. The hook body 1802 is formed from a unitary piece of metallic wire. The hook 1805 is formed of a double thickness portion 2015 and a handle portion 2010 is formed of a single thickness portion 2020. The double thickness portion 2015 is held together via one or more welds 2025. As should be appreciated, the hook 1805 is formed of double thick wire to increase strength. As has been mentioned previously, the hook 1805 is generally in the form of a "J" style hook while the handle portion 2010 is in the form of a rectangular and/or "T" shaped handle. The handle portion 2010 is configured to define an opening 2005. The opening 2005 is configured to receive the grip via snap-fit. In one embodiment, the wire has a circular cross-section. In other embodiments, the wire may have a rectangular, polygonal, and/or other cross-sectional shape.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"Anchor" generally refers to a structure that serves to firmly secure and/or hold an object. In other words, an anchor is structure to which an object is fixed to prevent substantial movement.

"Cantilever Spring" generally refers to a spring fixed only at one end. In one non-limiting example, the cantilever spring is in the form of a flat spring that is anchored at one and the other end extends freely away from the anchored end.

"Child Safety Seat", "Car Seat", or "Child Restraint System" generally refer to a seat that is specifically designed to protect children from injury during a vehicle collision. Commonly, the child safety seat is an aftermarket product that is installed by an owner into a vehicle after purchase of the vehicle, but the child safety seat can be also integrated into a seat of the vehicle by a manufacturer of the vehicle. In contrast to most vehicle seats, which are designed to accommodate adults, the child safety seat is sized and configured to properly position a child or infant to reduce injury during an accident. The child safety further typically includes a passive restraint system, such as a harness, that generally hold an occupant of the seat in place during a collision. The restraint system for example can include a five-point harness, but other types of harnesses and restraints can be used. When sold as a separate, aftermarket product, the child safety seat can include an anchoring mechanism, like an Isofix connecter, configured to secure the child safety seat to the vehicle (e.g., via an Isofix anchor in the vehicle). Some typical types of child safety seats include infant seats, convertible seats, combination seats, and booster seats, just to name a few.

"Conductor" generally refers to a material that allows energy in the form of heat, to transfer within the material, without any movement of the material itself. Put differently, conductors allow efficient transfer of energy in the form of heat. To name just a few examples, conductors can include metals, such as copper, iron, gold, silver, aluminum, titanium, mercury, and/or steel.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Flat Spring" generally refers to a flat strip of material that, when deflected by an external load, stores and releases energy. In one non-limiting example, flat springs include small, stamped metal components that function like a spring by controlling deflection within small or restricted spaces. Flat springs can also function as spacers and/or electrical contacts. Flat springs usually, but not always, are manufactured from high carbon spring steel, nickel-silver, high-nickel alloys, stainless steel, phosphor-bronze, and/or beryllium-copper combinations.

"Hook" generally refers to a length of material that contains a portion that is curved and/or indented, such that it can be used to grab onto, connect, or otherwise attach itself onto another object. In one non-limiting example, the hook includes a piece of material, such as made of metal and/or plastic, that is curved or otherwise bent back at an angle, for catching hold of another object.

"Insulator" generally refers to a material and/or structure that has a low thermal conductivity. Put differently, an insulator is a material and/or structure that does not conduct heat well. For example, insulators can be made from glass, porcelain, and/or plastic materials, to name just a few. Insulator structures for example can include air gaps and/or vacuums to minimize thermal conduction.

"Integrally Formed" generally refers to a component and/or multiple components that are fused into a single piece. Integrally formed components are incapable of being dismantled without destroying the integrity of the component.

"Isofix" or "ISOFIX" generally refers to an international standard for attachment points for child safety seats in passenger cars and other vehicles and/or attachment point or anchoring systems that satisfy the standard. More specifically, Isofix refers International Organization for Standardization (ISO) standard ISO 13216, which specifies the anchoring system for Group 1 child safety seats. This standard defines standard attachment points to be manufactured into cars, enabling compliant child safety seats to be quickly and safely secured. Isofix acts as an alternative to securing the seat with seat belts. In one form, child safety seats are secured with a single attachment at the top (e.g., top tether) and two attachments at the base of each side of the seat. The Isofix standard can be identified by other regional names. In the United States for example, the standard is commonly referred to as a LATCH ("Lower Anchors and Tethers for Children") system.

"Lateral" generally refers to being situated on, directed toward, or coming from the side.

"Leaf Spring" generally refers to a type of spring made from one or more strips of elastic material. In one form, multiple strips of elastic material are laminated together to form the leaf spring, and in other forms, a single strip of elastic material, such metal and/or plastic, forms the leaf spring. The leaf springs can be curved or substantially straight. The leaf spring can further include a frame to which the ends of the strips are attached.

"Lever" generally refers to a simple machine including a beam, rod, or other structure pivoted at a fulcrum, such as a hinge. In one form, the lever is a rigid body capable of rotating on a point on itself. Levers can be generally categorized into three types of classes based on the location of fulcrum, load, and/or effort. In a class 1 type of lever, the fulcrum is located in the middle such that the effort is applied on one side of the fulcrum and the resistance or load on the other side. For class 1 type levers, the mechanical advantage may be greater than, less than, or equal to 1. Some non-limiting examples of class 1 type levers include seesaws, crowbars, and a pair of scissors. In a class 2 type of lever, which is sometimes referred to as a force multiplier lever, the resistance or load is located generally near the middle of the lever such that the effort is applied on one side of the resistance and the fulcrum is located on the other side. For class 2 type levers, the load arm is smaller than the effort arm, and the mechanical advantage is typically greater than 1. Some non-limiting examples of class 2 type levers include wheelbarrows, nutcrackers, bottle openers, and automobile brake pedals. In a class 3 type lever, which is sometimes referred to as a speed multiplier lever, the effort is generally located near the middle of the lever such that the resistance or load is on one side of the effort and the fulcrum is located on the other side. For class 3 type levers, the effort arm is smaller than the load arm, and the mechanical advantage is typically less than 1. Some non-limiting examples of class 3 type levers include a pair of tweezers and the human mandible.

"Longitudinal" generally refers to the length or lengthwise dimension of an object, rather than across.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Seat Belt", "Safety Belt", "Vehicle Belt", or "Belt" generally refers to an arrangement of webs, straps, and other devices designed to restrain or otherwise hold a person or other object steady such as in a boat, vehicle, aircraft, and/or spacecraft. For example, the seat belt is designed to secure an occupant of a vehicle against harmful movement that may result during a collision or a sudden stop. By way of non-limiting examples, the seat belt can include webbing, buckles, latch plates, and/or length-adjustment mechanisms, such as a retractor, installed in the vehicle that is used to restrain an occupant or a child restraint system. The seat belt for instance can include a lap belt only, a combination lap-shoulder belt, a separate lap belt, a separate shoulder belt, and/or a knee bolster.

"Snap Hook", "Snap-Hook", or "Snaphook" generally refers to a mechanism having a hook with a gate, guard, and/or spring biased to allow entrance but prevent removal of an anchor structure, such as a cord, ring, strap, eye, and the like, from the hook.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Web" or "Webbing" generally refers to a strap made of a network of thread, strings, cords, wires, and/or other materials designed to restrain or otherwise hold a person or other object steady such as in a boat, vehicle, aircraft, and/or spacecraft. By way of non-limiting examples, the web can be incorporated into a seat belt, a child booster seat, and/or a car seat.

"Wire" generally refers to a long thin piece metal usually drawn out into the form of a flexible thread, strand, or slender rod.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

PART REFERENCE NUMBERS 100 restraint system
105 snap hook
110 belt
202 hook body
205 hook
210 clip insert
215 belt opening
220 gate
1105 opening
1110 handle portion
1205 opening
1210 tongue portion
1215 post
1305 groove
1310 prong
1315 ramp portion
1320 angled surface
1325 bend portion
1330 finger grooves
1335 arrow
1340 guide edge
1345 cutout
1405 first edge
1410 second edge
1415 first side
1502 second side
1505 nose
1510 foot
1515 pocket
1600 open position
1605 anchor point
1610 arched portion
1615 arrow
1620 gap
1625 free end
1700 closed position
1705 arrow
1800 snap hook
1802 hook body
1805 hook
1807 nose
1810 foot
1815 pocket
1900 snap hook
1910 clip insert
1915 belt opening
1917 groove
1918 tongue
1919 ledge
1920 gate
1925 free end
2005 opening
2010 handle portion
2015 double thickness portion
2020 single thickness portion
2025 weld

What is claimed is:

1. A system for securing a child safety seat, comprising:
a snap hook including
a hook body having a hook,
wherein the hook body defines an opening
a clip insert clipped to the hook body at the opening,
wherein the clip insert includes a gate configured to open and close the hook,
wherein the clip insert has a prong,
wherein the prong extends through the opening,
wherein the prong is clipped to the hook body at the opening,
wherein the gate is integrally formed with clip insert to form a unitary part,
wherein the gate extends through the opening in the hook body,
wherein the gate has a free end that extends from the clip insert to the hook,
wherein the free end of the gate contacts the hook when the gate is closed,
wherein the free end of the gate forms a gap between the free end and the hook when the gate is open, and
wherein the gate has a bend portion configured to bend to open the gate.

2. The system of claim 1, wherein the hook and the clip insert are made from two different materials.

3. The system of claim 2, wherein the hook is made from a conductive material.

4. The system of claim 3, wherein the hook is made from stamped metal.

5. The system of claim 3, wherein the hook is made from a bent metal wire.

6. The system of claim 2, wherein the clip insert is made from an insulative material.

7. The system of claim 6, wherein the clip insert is made of plastic.

8. The system of claim 1,
wherein the clip insert defines a belt opening through which a belt is looped.

9. The system of claim 1, wherein the clip insert includes a ramp portion configured to support a finger.

10. The system of claim 8, wherein the clip insert includes a clip tongue configured to clip to the opening in the hook body.

11. The system of claim 1, wherein the gate includes an arched section configured to receive a finger.

12. The system of claim 1,
wherein the hook includes a foot portion configured to interface with the free end of the gate to close the hook.

13. The system of claim 12, wherein the hook defines a pocket configured to receive an anchor point.

14. The system of claim 13, wherein the free end includes an angled surface configured to guide the anchor point into and out of the pocket.

15. The system of claim 1, wherein the gate is arranged parallel with the hook body when in a closed position.

16. The system of claim 1,
wherein the clip insert includes a groove configured to receive a first edge of the hook body.

17. The system of claim 1, wherein the clip insert includes a pair of finger grooves configured to enable a user to remove the clip insert from the hook body.

18. The system of claim 1, wherein the snap hook is configured to secure to an Isofix anchor.

19. The system of claim 1, wherein the clip insert defines a groove configured to receive an edge of the hook body at the opening to retain the clip insert with the hook body.

20. The system of claim 1, wherein:
the gate has an arched portion between the bend portion and the free end; and
the arched portion is configured to receive a finger to open the gate.

\* \* \* \* \*